US006754493B1

(12) United States Patent
Jetzek

(10) Patent No.: US 6,754,493 B1
(45) Date of Patent: Jun. 22, 2004

(54) METHOD AND SYSTEMS FOR DYNAMIC THRESHOLD ADJUSTMENT FOR HANDOFFS IN RADIO COMMUNICATION SYSTEMS

(75) Inventor: Ulrich Jetzek, Nürnberg (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/461,029

(22) Filed: Dec. 15, 1999

(30) Foreign Application Priority Data

Dec. 18, 1998 (WO) ............................... PCT/IB98/02076

(51) Int. Cl.[7] ............................................... H04Q 7/20
(52) U.S. Cl. ..................... 455/436; 455/437; 455/438; 455/442; 370/329; 370/331; 370/332
(58) Field of Search ................................. 455/436, 437, 455/438, 439, 440, 442; 370/328, 329, 330, 331, 332, 333, 334

(56) References Cited

U.S. PATENT DOCUMENTS

| 5,239,667 | A |   | 8/1993  | Kanai ........................... 455/10    |
| 5,379,446 | A |   | 1/1995  | Murase ....................... 455/33.2     |
| 5,422,933 | A |   | 6/1995  | Barnett et al. ................. 379/60     |
| 5,483,669 | A |   | 1/1996  | Barnett et al. ............. 455/33.2       |
| 5,548,812 | A | * | 8/1996  | Padovani et al. ............ 455/442        |
| 5,577,022 | A |   | 11/1996 | Padovani et al. ............. 370/13        |
| 5,640,414 | A |   | 6/1997  | Blakeney, II et al. ........ 375/200        |
| 5,678,185 | A |   | 10/1997 | Chia ........................... 455/33.2   |
| 5,701,585 | A |   | 12/1997 | Kallin et al. ................ 455/33.2     |
| 5,722,072 | A |   | 2/1998  | Crichton et al. ............ 455/437        |
| 5,722,073 | A |   | 2/1998  | Wallstedt et al. ........... 455/437        |
| 5,774,809 | A |   | 6/1998  | Tuutijarvi et al. .......... 455/437        |
| 5,828,661 | A | * | 10/1998 | Weaver, Jr. et al. ........ 370/331         |
| 5,917,811 | A | * | 6/1999  | Weaver, Jr. et al. ........ 370/332         |
| 6,055,428 | A | * | 4/2000  | Soliman ..................... 455/437       |
| 6,078,817 | A | * | 6/2000  | Rahman ..................... 455/452        |
| 6,160,798 | A | * | 12/2000 | Reed et al. .................. 370/331      |
| 6,192,246 | B1 | * | 2/2001 | Satarasinghe ............... 455/442       |
| 6,216,004 | B1 | * | 4/2001 | Tiedemann, Jr. et al. ... 455/442          |
| 6,266,529 | B1 | * | 7/2001 | Chheda ....................... 455/436      |
| 6,304,755 | B1 | * | 10/2001 | Tiedemann, Jr. et al. ... 455/437         |
| 6,307,849 | B1 | * | 10/2001 | Tiedemann, Jr. ............ 370/335        |
| 6,411,819 | B1 | * | 6/2002 | Gutowski ................... 455/525        |

FOREIGN PATENT DOCUMENTS

| EP | 0 631 451    | 12/1994 |
| EP | 0 685 974    | 12/1995 |
| EP | 0 817 517    | 1/1998  |
| GB | 2 287 858 A  | 9/1995  |
| GB | 2 313 740 A  | 12/1997 |
| WO | WO96/02117   | 1/1996  |
| WO | WO96/31078   | 10/1996 |
| WO | WO99/04593   | 1/1999  |

OTHER PUBLICATIONS

TR 45.5 Standardization Document, RTT Proposal for CDMA 2000, "CDMA System Description", vol. 18, Jul. 27, 1998, pps. 110–114.
International Search Report, Application No. PCT/EP99/10083, mailed Jul. 7, 2000.

* cited by examiner

Primary Examiner—Sinh Tran
Assistant Examiner—Temica M. Davis

(57) ABSTRACT

A method and system for performing handoffs in radiocommunication systems using adaptively variable thresholds are described. Adaptive thresholds are functions of the quality level of a best or worst transmission source in an active set. Ramp functions can be employed over a range of quality values within the adaptive threshold functions.

25 Claims, 5 Drawing Sheets

METHOD AND SYSTEMS FOR DYNAMIC THRESHOLD ADJUSTMENT FOR HANDOFFS IN RADIO COMMUNICATION SYSTEMS

This application claims priority under 35 U.S.C. §§119 and/or 365 to PCT/IB98/02076 filed in WIPO on Dec. 18, 1998; the entire content of which is hereby incorporated by reference.

BACKGROUND

The present invention relates generally to methods and systems for radiocommunications and, more particularly, to such systems in which a connection can be handed over from one channel or base station to another.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

In cellular systems, the capability is typically provided to transfer handling of a connection between, for example, a mobile station and a base station to another base station, as the mobile station changes its position and so moves out of the coverage area of one base station and into the coverage area of another base station. This type of handoff is commonly referred to as an "intercell" handoff as the coverage areas associated with base stations are commonly referred to as "cells". Depending upon the quality of the current channel, it may also be desirable to transfer a connection from one channel of the base station to another channel supported by the same base station, which handoffs are commonly referred to as "intracell" handoffs.

So-called "hard" handoffs refer to handoffs which are performed wherein there is no significant overlap between transmissions received from an original, serving base station and transmissions received from a new, target base station. As shown in FIG. 1(a), during hard handoff, the mobile station (MS) typically first breaks its connection to its original base station (BTS1) and then establishes a connection to its new base station (BTS2).

By way of contrast, "soft" handoffs refer to handoffs wherein, for some period of time, a mobile station receives substantially the same information from two (or more) transmission sources. An exemplary soft handoff scenario is illustrated in FIG. 1(b). Therein, before starting soft handoff, the MS is connected to BTS1. During the soft handoff, the MS establishes a connection to BTS2 without dropping the connection to BTS1. Each base station which is concurrently communicating with a particular mobile station may be referred to as a member of that mobile station's "active set". At some time after the connection to BTS2 is set up, the connection to BTS1 will be released which is the termination of the soft handover procedure. The overlapping transmissions from BTS1 and BTS2 permit the mobile station to smoothly switch from receiving information from its original, serving base station to receiving information from its new, target base station. During soft handoff, the mobile station may also take advantage of the fact that it is receiving substantially the same information from two sources to improve its received signal quality by performing diversity selection/combining of the two received signals.

For the sake of simplicity, the foregoing examples of the hard and soft handoff were described in the context of base stations employing omnidirectional antennas, i.e., wherein each base station transmits signals which propagate in a substantially circular direction, i.e., 360 degrees. However, as will be appreciated by those skilled in the art, other antenna structures and transmission techniques may also be employed in radiocommunication systems. For example, a cell can be subdivided into several sectors, e.g., into three sectors where each sector covers a 120 degree angle as shown in FIG. 2. Alternatively, the system or cell may employ an array antenna structure as shown in FIG. 3. Therein, an exemplary radio communication system 200 includes a radio base station 220 employing a fixed-beam phased array (not shown). The phased array generates a plurality of fixed narrow beams ($B_1$, $B_2$, $B_3$, $B_4$, etc.) which radially extend from the base station 220, at least one of which ($B_1$) is used to communicate with MS 210. Preferably, the beams overlap to create a contiguous coverage area to service a radio communication cell. Although not shown, the phased array can actually consist of three phased array sector antennas.

Of course, the principles described above with respect to hard and soft handoff for omnidirectional antennas in FIGS. 1(a) and 1(b) can be directly mapped to other systems which employ sectorized and/or array antennas. In these latter types of systems, hard and soft handoffs can be performed between sectors or beams of the same base station as well as between sectors or beams associated with different base stations.

Both types of handoff have their drawbacks and advantages. On the one hand, soft handoff provides a robust mechanism for changing the connection from one base station to another. However, since the mobile station is connected to more than one base station during soft handoff, soft handoff requires more system resources than hard handoff. An advantage of hard handoff, therefore, is a reduced need for system resources, while its drawback is a higher probability of dropped calls when compared to soft handoff.

Both hard and soft handoffs may be employed in radiocommunication systems using any type of access methodology, e.g., Frequency Division Multiple Access (FDMA), Time Division Multiple Access (TDMA), Code Division Multiple Access (CDMA), or any hybrid thereof. For the purposes of illustration, rather than limitation, this description shall primarily describe conventional techniques and techniques according to the present invention in terms of CDMA systems, however those skilled in the art will appreciate that the inventive techniques are equally applicable to systems employing any access methodology. In radiocommunication systems employing a CDMA access technique, a mobile station can be concurrently connected to one or more sectors that belong to one or more base stations. As mentioned above, the sectors which the mobile station uses for communication are called "active set". Consider, as an example, the system illustrated in FIG. 4 having cells C1 and C2 with the sectors S1 . . . S6 each. Let A, B and E denote the sectors C1-S1, C1-S2 and C2-S5, respectively, that the mobile station 400 is connected to, i.e., mobile station 400's active set.

Due to the movement of the mobile station 400 (and possibly other influences), the quality of each connection is time variant. Quality in this context refers to one or more specific types of measurement, e.g., the received signal strength or the downlink signal-to-interference ratio. To adapt to the time variance in quality of a connection, the mobile station 400 is provided with a set of sectors whose transmissions are to be monitored with respect to their received signal quality. This set is called the measurement set. By periodically evaluating the quality of the sectors in the measurement set, the mobile station 400 identifies a set of sectors that are suitable to be members of the active set, referred to as the candidate set. When the membership of the current active set and that of the candidate set differ from each other, the mobile station 400 sends a measurement report to the system, e.g., to a radio network controller (RNC, not shown). The measurement report contains information regarding the quality of transmission received from the sectors of the candidate set. The RNC then decides whether to perform a hard or soft handover, i.e., which sectors shall be added to and/or deleted from the active set. The RNC also requests setup and release of radio and network resources for the connection between the mobile station and the relevant base station(s)in order to perform the handoff. After the handoff has been accomplished, the contents of the active set are updated in the mobile station (and the RNC).

However, there exist a number of different techniques by which to evaluate whether, based on the measurements reported by the mobile station to the system, a handoff is desirable and, if so, what type of handoff. Some of these techniques used fixed thresholds, while others use dynamic thresholds. For example, U.S. Pat. No. 5,422,933 describes a method and system for handing off an ongoing communication from a serving cell to a neighboring cell of a cellular communication system. A dynamic threshold is calculated for effecting handover in accordance with various operating conditions. The current mobile minimum attenuation level, the minimum permissible attenuation level of a serving cell and a neighboring cell, together with the RF signal strength of the mobile unit at the neighboring cell and the serving cell are used in calculating the dynamic threshold.

Another example can be found in U.S. Pat. No. 5,483,669, which patent describes a method and system for handing off an on-going communication from a sending to a neighboring cell of a cellular communication system. A dynamic threshold is calculated for effecting the handoff, for example based on a minimum attenuation level of the mobile unit and a minimum level permitted by a neighboring cell. These latter two systems, however, suffer from the drawback that the determination of the dynamic threshold is rather complex due to the number of cases to be considered and that there is no provision for handling soft handoff.

More recently, a proposal has been described for a CDMA system known as CDMA 2000. Within the CDMA 2000 documentation there is a description of dynamic thresholds used for soft handoff. According to this description, a forward pilot channel is added to the candidate set if a measured quality level exceeds a given static threshold T1. The candidate set contains the sectors that are evaluated more frequently and that are tested against a second dynamic threshold T2. The dynamic threshold T2 is calculated based on using the sum of the received signal quality measurements for all pilot channels in the active set. However, this scheme suffers from the limitation that it is only provided for the forward link (i.e, the downlink), is also rather complex and requires a two-step (i.e., evaluation with respect to static and dynamic threshold) procedure for addition and deletion of sectors to and from the active set.

Accordingly, there is a need to develop enhanced techniques to determine when a handoff is appropriate, and which type of handoff is appropriate, to efficiently utilize system resources under different operating conditions.

SUMMARY

These, and other, problems, drawbacks, and limitations of conventional handoff techniques, are overcome according to the present invention in which adaptive thresholds can be provided for a variety of different thresholds used in evaluating the desirability of both soft and hard handoffs. According to exemplary embodiments, soft handoff thresholds for adding, deleting and replacing members of the active set vary based on a quality level of a best or worst member of the current active set. Similarly, a threshold used to determine when a hard handoff is desirable can also be made variable based on a quality level of an active set member.

The present invention provides a number of benefits as compared with conventional techniques for performing handoffs including: (1) flexibly controlling both hard and soft handoffs, (2) less complex threshold calculation that is, at the same time, dynamic in nature so as to vary with changes in channel quality, (3) a reduction in the average number of sectors (or other types of transmission sources, e.g., beams) that a mobile station is concurrently connected to, (4) providing a mechanism for controlling the relative number of soft and hard handoffs by selection of the minimum and maximum threshold values and the slopes in the adaptive threshold functions, (5) a reduction in the probability of dropped calls as compared to conventional techniques which employ higher, fixed handoff thresholds and (6) a reduction in interuser interference as compared to conventional techniques which employ case that employ lower, fixed thresholds such that the active set contains a relatively high number of sectors.

BRIEF DESCRIPTION OF THE DRAWINGS

The foregoing, and other, objects, features and advantages of the present invention will be more readily understood upon reading the following detailed description in conjunction with the drawings in which:

FIG. 1(*b*) is an illustration of soft handoff;

DETAILED DESCRIPTION

In the following description, for purposes of explanation and not limitation, specific details are set forth, such as particular circuits, circuit components, techniques, etc. in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary details.

Figure 5:
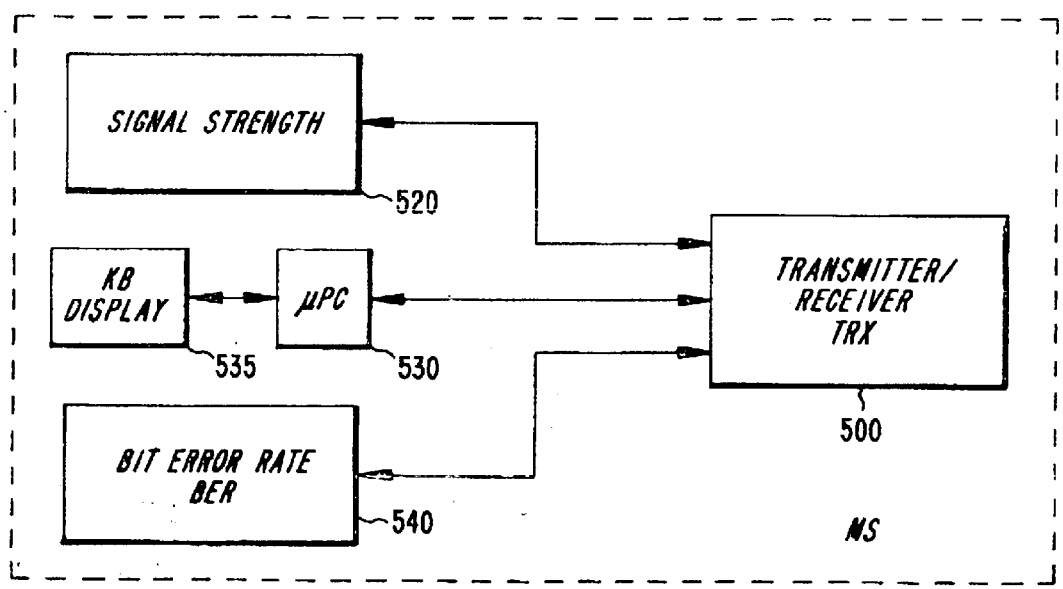
FIG. 5 depicts a portion of an exemplary mobile station structure.

Prior to describing the details of the present invention, a partial example of the construction of a mobile station which can operate to perform the signal quality measurements described above is illustrated in FIG. 5. This block diagram has been simplified to illustrate only those components relevant to the measurement of downlink signal strength, however those skilled in the art will be well aware of the other major functional blocks associated with mobile stations. In FIG. 5, incoming radio signals are received by transmitter/receiver TRX 500. The timing is synchronized to the received symbol sequence by microprocessor controller 530. The strength of the received signals are measured by a signal strength measuring part 520, the value of which is then passed to microprocessor controller 530. The bit error rate (BER) of the received signal can also be determined as an indication of received signal quality as reflected by block 540. This measurement of received signal quality is particularly relevant in determining when an intracell handoff is desirable. Those skilled in the art will appreciate that other quality measures, e.g., signal-to-interference ratio, can also be used in handoff algorithms. The mobile station will also have input/output devices, such as a keyboard and display 535, as well as a microphone and speaker unit (not shown), which enables information to be exchanged between the mobile station and the base station.

Figure 1A:
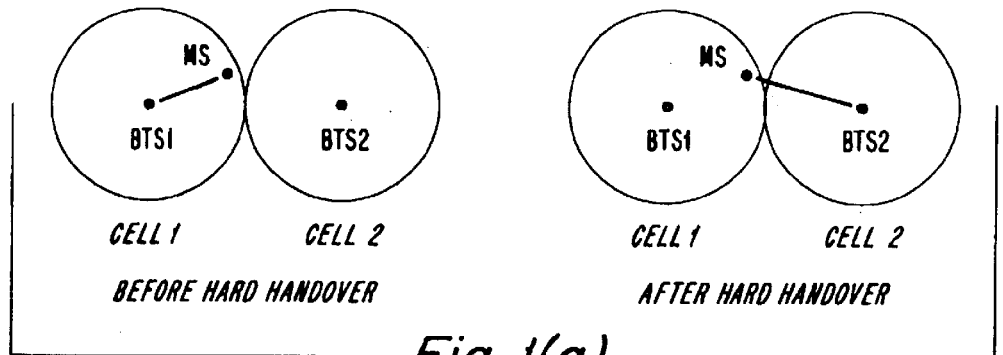
FIG. 1(*a*) is an illustration of hard handoff.
Figure 1B:
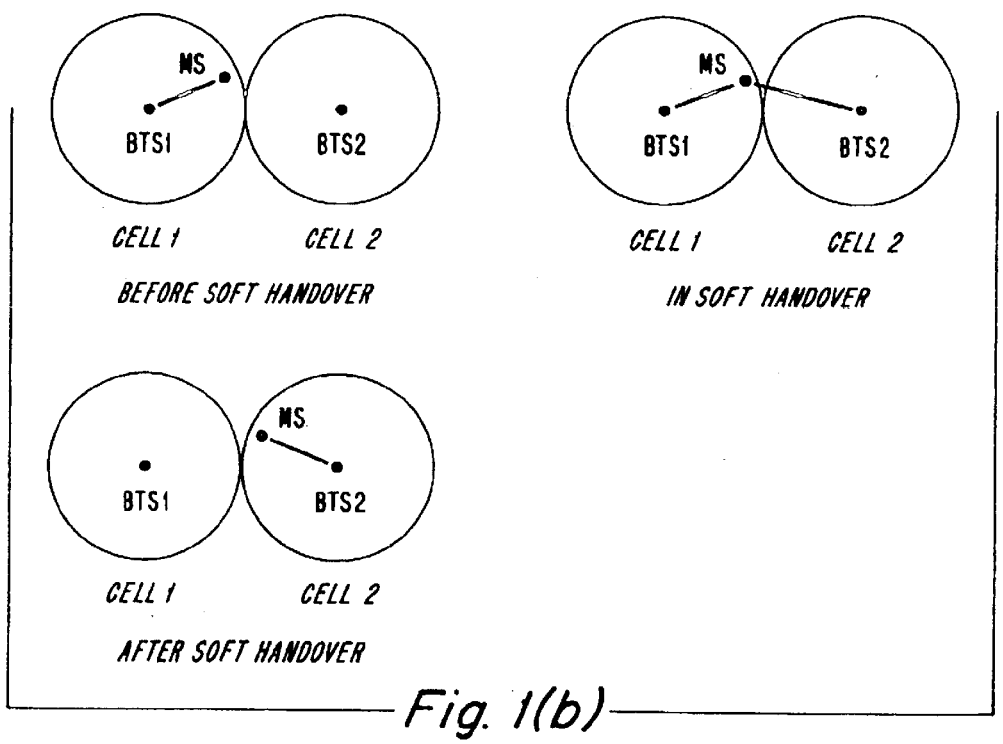
Figure 2:
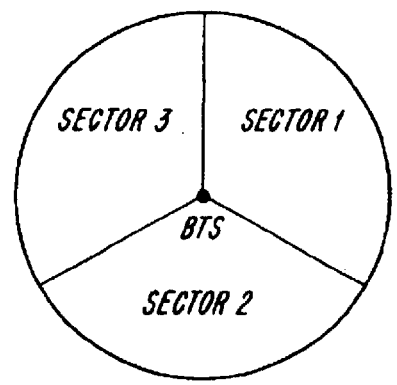
FIG. 2 depicts a base station employing sector antennas.
Figure 3:
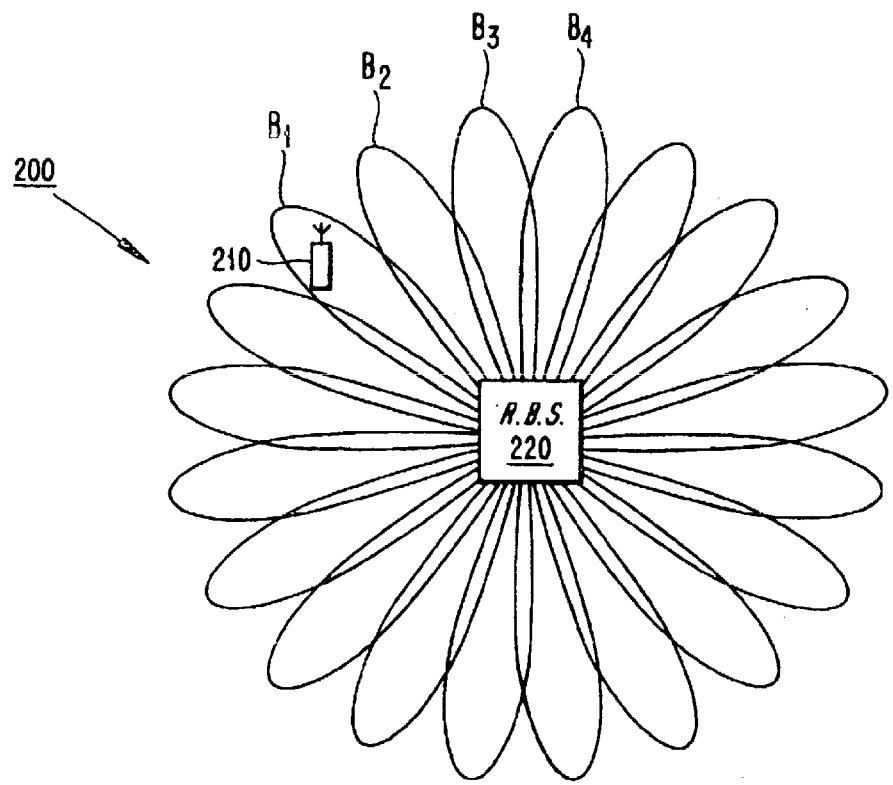
FIG. 3 shows a base station employing an array antenna.
Figure 4:
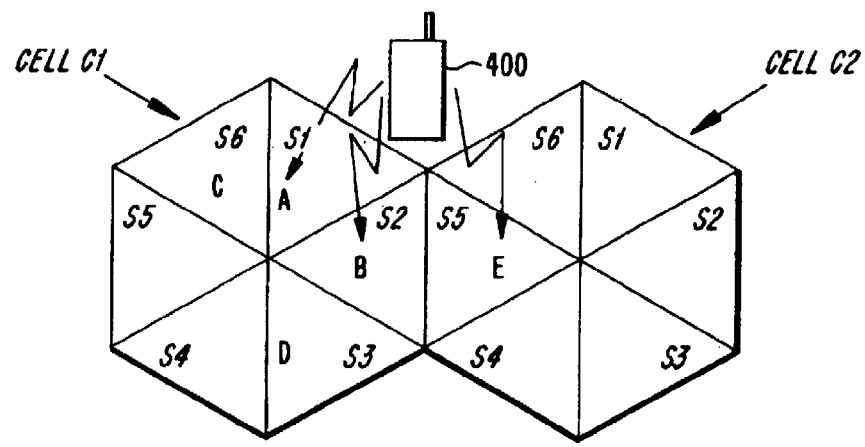
FIG. 4 is an illustration of two, six sectored cells in communication with a mobile station.
Figure 6:
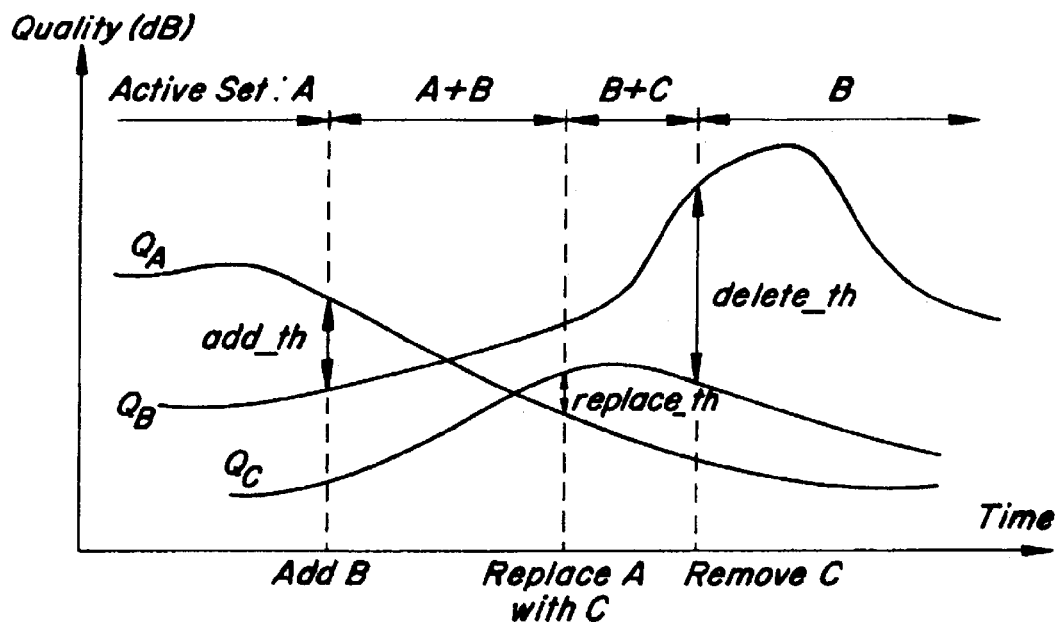
FIG. 6 is a graph illustrating various handoff algorithm conditions for adding, deleting and replacing sectors according to an exemplary embodiment of the present invention.

When the mobile station receives a list of channel numbers and/or codes in a MAHO (mobile assisted handover) command, it will measure the received signal quality associated with each of those channels. Once the mobile station has made the requested measurements, it will report them to the system which will then evaluate the various sectors using a handoff algorithm. An example is provided in FIG. 6 to illustrate how the active set may change over time based on applying a handoff algorithm to these measurements. In FIG. 6, it is assumed that only sector A (e.g., as shown in FIG. 4) belongs to the active set at the beginning. The measurement set in this example contains all sectors of the active set and all the neighbors of the active set. As only sector A is a member of the active set in this example, the measurement set consists of sectors C1-S1(=A), C1-S2(=B), C1-S6(=C).

For this example, the handoff algorithm dictates that different handoff actions will be triggered according to the conditions stated below:

1. Add a sector: A sector X is added to the current active set if its quality $Q_x$ meets the following condition:

$Q_x > Q_{best}$ –add_th where $Q_{best}$ represents the quality of the sector with the best quality in the Active Set and add_th is a threshold value. For example, as shown in FIG. 6, sector B is added to the active set at the time instant marked 'Add B' since the difference between its quality level and the quality level received from sector A is equal to add_th. Note that after time 'Add B', sector D (C1-S3) is added to the measurement set because it is a neighbor to sector B.

2. Delete a sector: A sector X is deleted from the current active set if its quality $Q_x$ meets the following condition:

$Q_x < Q_{best}$ –delete_th where delete_th represents the deletion threshold. An example of this condition occurring may be found at time instant marked 'Remove C' in FIG. 6, wherein sector C is removed from the active set since the difference between its received quality level and that of sector B exceeds delete_th.

3. Replace a sector: A sector X replaces the sector with the worst quality in the active set if the active set is full and the following condition holds:

$Q_x > Q_{worst}$ +replace_th where replace_th represents the threshold used for sector replacement. Provided that the maximum number of sectors in the active set is two in FIG. 6, sector C should replace sector A at time instant marked 'Replace A with C' in FIG. 6. The actions described in this handoff algorithm to add, delete or replace a sector occur as soft handoffs in this example, unless the hard handoff threshold is exceeded in which case hard handoff takes precedence.

4. Perform a hard handover: A hard handover from the current active set to a new sector is carried out if the quality $Q_x$ of sector X fulfills the following condition:

$Q_x > Q_{best}$ +hho_th where hho_th represents the threshold used for hard handover, i.e., all connections of the current active set will be removed and a new connection to sector X will be set up. In this regard, it should be noted that the mobile station will typically not have the possibility to measure the quality of all sectors in the measurement set continuously and, similarly, will not have the possibility to send measurement reports to the network continuously. Instead, the mobile station will perform measurements periodically, e.g., as represented by the dashed vertical lines in FIG. 7, by measuring the quality of the sectors in the measurement set at specific time instants. If the quality of a measured sector increases rather slowly, either a sector replacement (if the active set is full) or a sector addition (if the active set is not full) will be performed. In such a case, i.e., a slow quality increase of a measured sector, a sector's quality may never exceed the hard handoff threshold with respect to the best active set sector quality.

On the other hand, the sector quality of a measured sector may increase very rapidly. This might occur, for example, if the mobile station measures a specific sector that has poor quality due to the shadowing effects caused by a building or other obstacle. When the mobile station moves out of the shadowing area, the mobile station may then have a direct line of sight with the base station of the measured sector. This will lead to a rapid quality increase for the measured sector.

Figure 7:
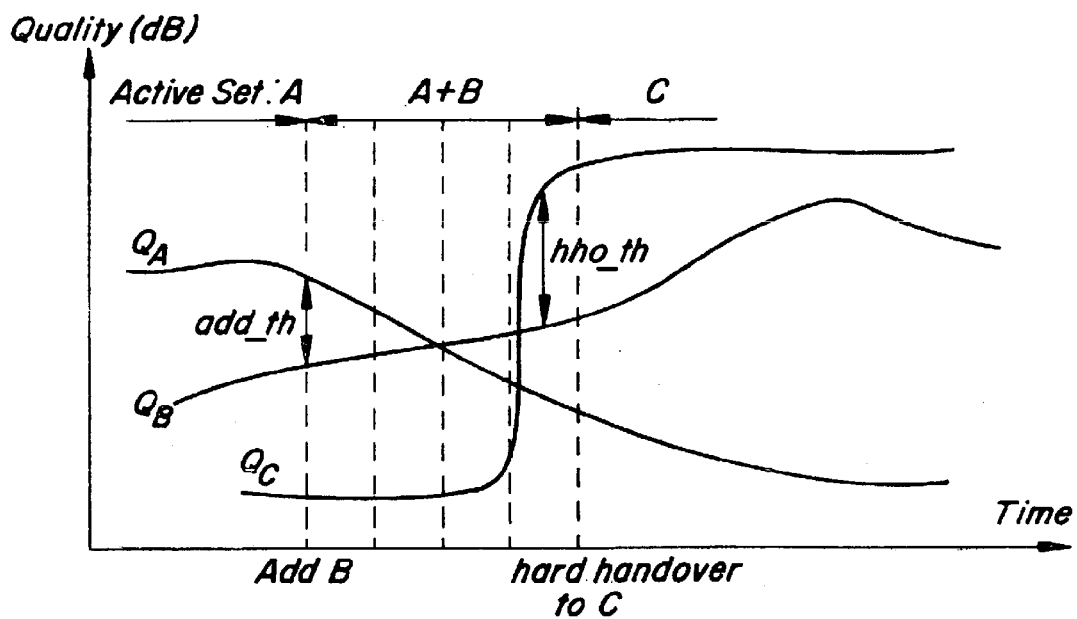
FIG. 7 is a graph illustrating algorithm conditions for hard handoff according to an exemplary embodiment of the present invention.

This latter scenario is illustrated in FIG. 7. Therein, the mobile station's active set includes sectors A and B after time "Add B". The quality of sector C, however, remains relatively low such that sector C will neither replace the worst sector in the active set nor will it be added to the active set. Then, as seen in the Figure, the measured quality of sector C increases very rapidly, at which time a hard handover to sector C is performed.

While the aforedescribed exemplary handoff technique has some advantages as compared with the techniques described in the Background section of this specification, e.g., it is easier to implement since it is a straightforward one-step procedure and it is more flexible since it can be applied to soft and hard handoff, it is also limited by its usage of fixed threshold values. However, using fixed thresholds means that this the handoff algorithm is not able to adapt to changes in the transmission quality in different channels and will therefore inefficiently handle radio and network resources. For example, if the fixed handoff thresholds are set very tightly, such that a sector in the measurement set must have relatively good quality before being added to the active set, then the mobile station might lose its connection if it does not identify any sectors as being good enough for the active set, which means that the handoff algorithm will unnecessarily increase the dropped call probability. Alternatively, if the thresholds are set rather loosely, such that sectors are more likely to be added to the active set, the mobile station will be more likely to be connected to a large number of sectors and will therefore allocate more system resources (e.g., short codes) than are really needed to maintain the connection. Moreover, when the thresholds for soft handoff (add_th, delete_th, replace_th) and the threshold for hard handoff (hho_th) are set to a fixed value, the system cannot control the rate of soft handoffs relative to hard handoffs.

Therefore, according to exemplary embodiments of the present invention, the thresholds, e.g., add_th, delete_th, replace_th and hho_th, employed in making hard and soft handoff decisions may all be dynamically adjusted based on, for example, the current sector quality of the best ($Q_{best}$) and the worst sector ($Q_{worst}$) in the active set, respectively, during an observation time t. Therefore, according to this exemplary embodiment, the thresholds will be functions f_(.) of the following variables:

$$\text{add\_th} = f_{add}(Q_{best}, t)$$

$$\text{delete\_th} = f_{delete}(Q_{best}, t)$$

$$\text{replace\_th} = f_{replace}(Q_{worst}, t)$$

$$\text{hho\_th} = f_{hho}(Q_{best}, t)$$

The computation of each dynamic threshold reflects the current transmission situation, i.e., the active set can be reduced to a few sectors (or possibly one sector) if the transmission situation is good and will be increased if the transmission situation gets worse. In addition to this, the computation of each dynamic threshold depends only on the quality of one sector of the active set, i.e., $Q_{best}$ or $Q_{worst}$ and a few other fixed system parameters and is, therefore, relatively straightforward to calculate. According to exemplary embodiments of the present invention described below, the complexity of handoff algorithms according to the present invention is further reduced by using adaptive threshold functions which are linear within different intervals.

Figure 8:
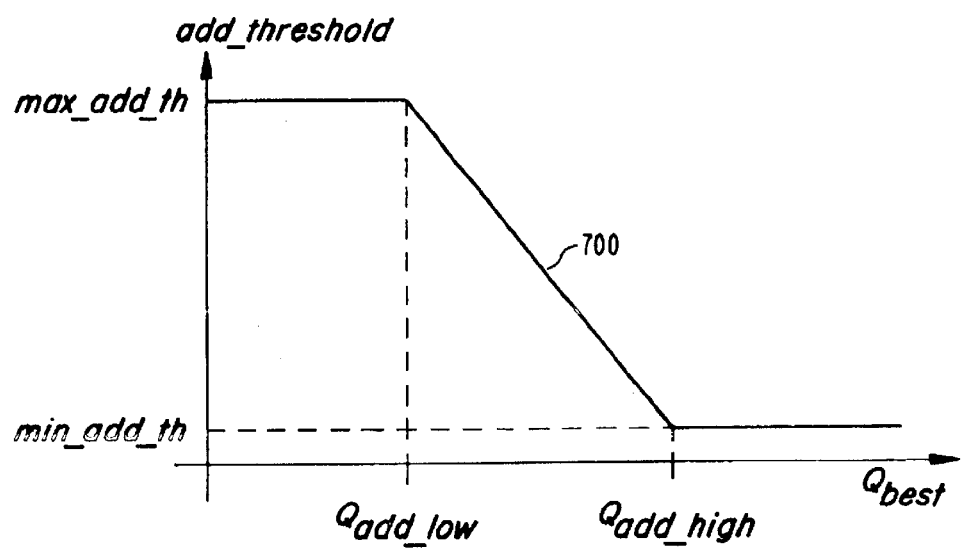
FIG. 8 is a graph depicting a variable add threshold according to an exemplary embodiment of the present invention.

According to the examples provided herein, the thresholds add_th, delete_th, replace_th and hho_th are ramp functions. Although useful due to their low computational complexity, those skilled in the art will appreciate that such thresholds may be implemented using any function, linear or non-linear, other than ramp functions that permits adaptation based on changing quality conditions in the radio channels. In the following discussion, however, a brief description of exemplary threshold functions is provided wherein the thresholds are ramp functions over a certain range of quality values, and remain at a constant high and low value outside this range, respectively. An illustration of an exemplary threshold function for add_th is provided as FIG. 8. Since add_th is a function of $Q_{best}$, the graph depicts varying values for add_th based on the current quality of $Q_{best}$. When the quality of $Q_{best}$ is lower than $Q_{add\_low}$, then add_th has its highest value of max_add_th. Within the range between $Q_{add\_low}$ and $Q_{add\_high}$, the value of add_th is determined based on the ramp function 700. Although the ramp function 700 has a negative slope, it will be appreciated that other threshold functions may employ ramp functions having a positive slope. If the quality of $Q_{best}$ is $Q_{add\_high}$ or higher, then add_th is set to its lowest value of min_add_th.

Specific, yet still exemplary and illustrative, threshold functions are described below mathematically for add_th, delete_th, replace_th and hho_th. In these equations it is assumed that the sector quality, the threshold values, and all other values described below are in dB units. The other assumptions for the threshold functions are as follows:

xxx_slope is the slope of the ramp function, where xxx_slope>0 (xxx=add, delete, rep or hho);

max_xxx_th is greater than min_xxx_th; and $Q_{xxx\_high}$ is greater than $Q_{xxx\_low}$ Variable Add Threshold Function if $Q_{best}<Q_{add\_low}$, then add_th=max_add_th;

if $Q_{add\_low}<=Q_{best}<=Q_{add\_high}$, then add_th=max_add_th−add_slope*($Q_{best}$−$Q_{add\_low}$);

if $Q_{best}>Q_{add\_high}$, then add_th=min_add_th;

where $Q_{add\_low}$, $Q_{add\_high}$, min_add_th, max_add_th and add_slope are set to fixed values.

Variable Delete Threshold Function if $Q_{best}<Q_{delete\_low}$, then delete_th=max_delete_th;

if $Q_{delete\_low}<=Q_{best}<=Q_{delete\_high}$, then delete_th=max_delete_th−delete_slope*($Q_{best}$−$Q_{delete\_low}$);

if $Q_{best}>Q_{delete\_high}$, then delete_th=min_delete_th;

where $Q_{delete\_low}$, $Q_{delete_{13}\_high}$, min_delete_th, max_delete_th and delete_slope are set to fixed values.

Variable Replace Threshold Function if $Q_{worst}<Q_{rep\_low}$, then replace_th=min_replace_th;

if $Q_{rep\_low}<=Q_{worst}<=Q_{rep\_high}$, then replace_th=min_replace_th−replace_slope*($Q_{rep\_low}$−$Q_{worst}$);

if $Q_{worst}>Q_{rep\_high}$, then replace_th=max_replace_th;

where $Q_{rep\_low}$, $Q_{rep\_high}$, min_rep_th, max_rep_th and rep_slope are set to fixed values.

Variable Hard Handoff Threshold if $Q_{best}<Q_{hho\_low}$, then hho_th=max_hho_th;

if $Q_{hho\_low}$ dB<=$Q_{best}<=Q_{hho\_high}$, then hho_th=max_hho_th−hho_slope*($Q_{best}$−$Q_{hho\_low}$);

if $Q_{best}>Q_{hho\_high}$, then hho_th=min_hho_th;

where $Q_{hho\_low}$, $Q_{hho\_high}$, min_hho_th, max_hho_th and hho_slope are set to fixed values.

By dynamically adjusting the various handoff thresholds in this manner, as the quality of transmissions from the best sector increases, fewer sectors will be added to the active set and, therefore, system resources will be saved. Conversely, as the quality of transmissions from the best sector deteriorates, more sectors will be added to the active set and, therefore, the overall quality of the connection can be maintained at a desirable level. In addition, the higher the quality of the transmissions from the best sector, the more likely a hard handoff will be, which also contributes to an efficient use of system resources.

It will therefore be appreciated that the present invention provides a number of benefits as compared with conventional techniques for performing handoffs including: (1) flexibly controlling both hard and soft handoffs, (2) less complex threshold calculation that is, at the same time, dynamic in nature so as to vary with changes in channel quality, (3) a reduction in the average number of sectors (or other types of transmission sources, e.g., beams) that a mobile station is concurrently connected to, (4) providing a mechanism for controlling the relative number of soft and hard handoffs by selection of the minimum and maximum threshold values and the slopes in the adaptive threshold functions, (5) a reduction in the probability of dropped calls as compared to conventional techniques which employ higher, fixed handoff thresholds and (6) a reduction in interuser interference as compared to conventional techniques which employ case that employ lower, fixed thresholds such that the active set contains a relatively high number of sectors.

The above-described exemplary embodiments are intended to be illustrative in all respects, rather than restrictive, of the present invention. For example, although the preceding exemplary embodiments do not reference multiple frequency bands, it will be apparent to those skilled in the art that the present invention is applicable to systems employing multiple frequency bands for communication and, therefore, to either intrafrequency or interfrequency band handoff. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for controlling membership in an active set comprising the steps of:
    providing a plurality of thresholds for controlling membership in said active set including:
        a first threshold for determining when to add a transmission source to said active set;
        a second threshold for determining when to delete a transmission source from said active set;
        a third threshold for determining when to replace a member of said active set with another transmission source; and
        a fourth threshold for determining when to perform a hard handoff from at least one current member of said active set to another transmission source;
    varying a value of at least one of said plurality of thresholds as a function of a quality level associated with a member of said active set; and
    controlling membership in said active set based on a result of said varying step.

2. The method of claim 1, wherein said at least one of said plurality of thresholds is said first threshold which varies as a non-constant function of a quality level of a transmission source having a best quality level in said active set.

3. The method of claim 2, wherein said non-constant function includes a ramp function between a maximum and a minimum value of said first threshold.

4. The method of claim 1, wherein said at least one of said plurality of thresholds is said second threshold which varies as a non-constant function of a quality level of a transmission source having a best quality level in said active set.

5. The method of claim 4, wherein said non-constant function includes a ramp function between a maximum and a minimum value of said second threshold.

6. The method of claim 1, wherein said at least one of said plurality of thresholds is said third threshold which varies as a non-constant function of a quality level of a transmission source having a worst quality level in said active set.

7. The method of claim 6, wherein said non-constant function includes a ramp function between a minimum and a maximum value of said third threshold.

8. The method of claim 1, wherein said at least one of said plurality of thresholds is said fourth threshold which varies as a non-constant function of a quality level of a transmission source having a best quality level in said active set.

9. The method of claim 8, wherein said non-constant function includes a ramp function between a maximum and a minimum value of said fourth threshold.

10. A control node in a radiocommunication system comprising:
    a receiver for receiving signal quality measurements reported by a mobile station; and
    a processor for determining whether a handoff is desirable for said mobile station based upon an evaluation of said signal quality measurements and a plurality of adaptive thresholds whose values vary based upon a quality level associated with a transmission source in said mobile station's active set wherein said plurality of adaptive thresholds includes at least one adaptive threshold that varies as a non-constant function of a quality level of a transmission source having a best quality level in said active set wherein said non-constant function includes a ramp function between a maximum and a minimum value of said at least one adaptive threshold.

11. The control node of claim 10, wherein said plurality of adaptive thresholds include:
    a first threshold for determining when to add a transmission source to said active set; and
    a second threshold for determining when to delete a transmission source from said active set.

12. The control node of claim 10, wherein said transmission source is one of a cell, a base station, a sector antenna and a beam associated with an antenna array.

13. The control node of claim 10, wherein said plurality of adaptive thresholds include:
    a threshold for determining when to replace a member of said active set with another transmission source.

14. The control node of claim 10, wherein said plurality of adaptive thresholds include:
    a threshold for determining when to perform a hard handoff from at least one current member of said active set to another transmission source.

15. The control node of claim 10, wherein said control node is a switching node.

16. A system for controlling membership in an active set comprising:
    a first threshold means for determining when to add a transmission source to said active set;
    a second threshold means for determining when to delete a transmission source from said active set;
    means for varying a value of at least one of said first and second threshold means as a function of a quality level associated with a member of said active set;
    means for controlling membership in said active set as a result of said varying means; and
    a third threshold means for determining when to replace a member of said active set used in a hard handoff with another transmission source, wherein said means for varying varies at least one of said first, second and third threshold.

17. The system of claim 16, wherein said value of at least one of said first and second threshold means is a value of said first threshold means which varies as a non-constant function of a quality level of a transmission source having a best quality level in said active set.

18. The system of claim 17, wherein said non-constant function includes a ramp function between a maximum and a minimum value of said first threshold.

19. The system of claim 16, wherein said value of at least one of said first and second threshold means is a value of said second threshold means which varies as a non-constant function of a quality level of a transmission source having a best quality level in said active set.

20. The system of claim 19, wherein said non-constant function includes a ramp function between a maximum and a minimum value of said second threshold.

21. A system for controlling membership in an active set comprising:

a first threshold means for determining when to add a transmission source to said active set;

a second threshold means for determining when to delete a transmission source from said active set;

means for varying a value of at least one of said first and second threshold means as a function of a quality level associated with a member of said active set;

means for controlling membership in said active set as a result of said varying means; and a third threshold means for determining when to perform a hard handoff from at least one current member of said active set to another transmission source, wherein said means for varying varies at least one of said first, second and third threshold means.

22. The system of claim 21, wherein said value of at least one of said first and second threshold means is a value of said first threshold means which varies as a non-constant function of a quality level of a transmission source having a best quality level in said active set.

23. The system of claim 22, wherein said non-constant function includes a ramp function between a maximum and a minimum value of said first threshold.

24. The system of claim 21, wherein said value of at least one of said first and second threshold means is a value of said second threshold means which varies as a non-constant function of a quality level of a transmission source having a best quality level in said active set.

25. The system of claim 24, wherein said non-constant function includes a ramp function between a maximum and a minimum value of said second threshold.

\* \* \* \* \*